United States Patent
Liu et al.

(10) Patent No.: US 11,991,628 B2
(45) Date of Patent: May 21, 2024

(54) BLUETOOTH MESH NETWORK SYSTEM AND CONNECTION METHOD HAVING WAKE-UP MANAGEMENT MECHANISM

(71) Applicant: REALTEK SEMICONDUCTOR CORPORATION, Hsinchu (TW)

(72) Inventors: Yong Liu, Suzhou (CN); Shi-Meng Zou, Suzhou (CN); Yang Huang, Suzhou (CN); Bin Shao, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 206 days.

(21) Appl. No.: 17/361,368

(22) Filed: Jun. 29, 2021

(65) Prior Publication Data
US 2022/0182932 A1    Jun. 9, 2022

(30) Foreign Application Priority Data
Dec. 8, 2020    (CN) .......................... 202011422834.3

(51) Int. Cl.
*H04W 52/02*    (2009.01)
*H04W 4/80*    (2018.01)
*H04W 84/18*    (2009.01)

(52) U.S. Cl.
CPC ......... *H04W 52/0216* (2013.01); *H04W 4/80* (2018.02); *H04W 84/18* (2013.01)

(58) Field of Classification Search
CPC ... H04W 52/0216; H04W 4/80; H04W 84/18; H04W 4/06; H04W 52/0219; H04W 52/0229; H04W 52/0248; Y02D 30/70
See application file for complete search history.

(56) References Cited

U.S. PATENT DOCUMENTS 10,117,078 B1 *  10/2018  Mendelson .......... H04W 4/023
10,356,824 B2   7/2019  Qiao et al.
(Continued)

FOREIGN PATENT DOCUMENTS

CN     105959921 A    9/2016
CN     111630902 A    9/2020
(Continued)

OTHER PUBLICATIONS

OA letter of the counterpart TW application(appl. No. 109144929) dated Aug. 16, 2021. Summary of the OA letter: 1.Claims 1~10 are rejected as being unpatentable over the disclosure of the cited reference 1 (CN105959921A, also published as US10356824B2) in view of the cited reference 2 (CN111630902A, also published as US10742429B2).

*Primary Examiner* — Jay P Patel
(74) *Attorney, Agent, or Firm* — WPAT, PC

(57) ABSTRACT

The present invention discloses a Bluetooth mesh network system having wake-up management mechanism that includes a control node and low power nodes. The control node broadcasts a wake-up parameter setting packet at broadcast time spots based on a broadcast period. Each of the low power nodes receives the wake-up parameter setting packet to be operated in a wake-up management mode to configure a start time spot, a time length and a period interval length of a wake-up period that is synchronous among the low power nodes accordingly. The control node further transmits data corresponding to the low power nodes in the wake-up period and the low power nodes is operated in a wake-up state within the wake-up period to receive the data from the control node and is operated in a sleep state outside of the wake-up period.

10 Claims, 2 Drawing Sheets

(56) References Cited

U.S. PATENT DOCUMENTS

| | | | |
|---|---|---|---|
| 10,742,429 B2 | 8/2020 | Murali et al. | |
| 11,063,651 B1* | 7/2021 | Siann | G06F 1/3237 |
| 11,503,544 B2* | 11/2022 | Ahmad | H04W 52/0209 |
| 2009/0122737 A1* | 5/2009 | Twitchell, Jr. | H04W 52/0235 370/311 |
| 2016/0007288 A1* | 1/2016 | Samardzija | H04W 52/0229 370/311 |
| 2016/0183112 A1* | 6/2016 | Yang | H04L 5/0053 370/252 |
| 2018/0018618 A1* | 1/2018 | Groseclose | H04W 84/18 |
| 2019/0246355 A1* | 8/2019 | Guo | H04W 74/0808 |
| 2019/0281549 A1* | 9/2019 | Gan | H04W 48/16 |
| 2020/0092814 A1* | 3/2020 | Zhou | H04W 52/0235 |
| 2020/0178178 A1* | 6/2020 | Huang | H04W 52/028 |
| 2020/0229093 A1* | 7/2020 | Ahmad | H04W 52/0216 |
| 2020/0280920 A1* | 9/2020 | Huang | H04W 52/0229 |
| 2020/0314747 A1* | 10/2020 | Zhou | H04L 5/0053 |
| 2020/0344684 A1* | 10/2020 | Rantala | H04W 52/02 |
| 2022/0022281 A1* | 1/2022 | Wang | H04W 76/28 |

FOREIGN PATENT DOCUMENTS

| | | | | |
|---|---|---|---|---|
| WO | WO-2017124850 A1 * | 7/2017 | | H04W 52/02 |
| WO | WO-2020204484 A1 * | 10/2020 | | H04W 52/0235 |
| WO | WO-2020204488 A1 * | 10/2020 | | H04L 5/0053 |
| WO | WO-2021082012 A1 * | 5/2021 | | |

* cited by examiner

BLUETOOTH MESH NETWORK SYSTEM AND CONNECTION METHOD HAVING WAKE-UP MANAGEMENT MECHANISM

BACKGROUND OF THE INVENTION

1. Field of the Invention

The present invention relates to a Bluetooth mesh network system and a Bluetooth mesh network system connection method having wake-up management mechanism.

2. Description of Related Art

Along with the quick development of Internet of Things (IoT) technology in recent years, the applications of smart home, smart building and smart factory increase in a great deal. The technology of Bluetooth, which is a lower power consumption technology, becomes more and more important. The standard organization of Bluetooth, i.e. Bluetooth Special Interest Group (Bluetooth SIG), intends to implement many-to-many communication by introducing Bluetooth mesh network technology, to provide communications with longer transmission distance. Such technology is considered to expand the IoT market.

In Bluetooth mesh network technology, a low power node has to receive data through a friend node. However, different lower power nodes connect to the friend node to perform communication at different time spots. More resource of the friend node is consumed by using such a method such that the friend node does not allow more low power nodes to be connected thereto. Further, the low power node is required to disconnect with the friend node first and reconnect to the friend node so as to modify a connection setting with the friend node. Such an operation method is not elastic.

SUMMARY OF THE INVENTION

In consideration of the problem of the prior art, an object of the present invention is to provide a Bluetooth mesh network system and a Bluetooth mesh network system connection method having wake-up management mechanism.

The present invention discloses a Bluetooth mesh network system having wake-up management mechanism that includes a control node and a plurality of low power nodes. The control node is configured to broadcast a wake-up parameter setting packet at broadcast time spots based on a broadcast period. Each of the low power nodes is configured to receive the wake-up parameter setting packet to be operated in a wake-up management mode, to set a start time spot, a time length and a period interval length of a wake-up period that is synchronous among the low power nodes according to the wake-up parameter setting packet. The control node is further configured to transmit data corresponding to the low power nodes in the wake-up period, and each of the low power nodes is operated in a wake-up state within the wake-up period to receive the data from the control node and is operated in a sleep state outside of the wake-up period.

The present invention also discloses a Bluetooth mesh network system connection method having wake-up management mechanism includes the steps outlined below. A wake-up parameter setting packet is broadcasted at broadcast time spots based on a broadcast period by a control node. The wake-up parameter setting packet is received by each of a plurality of low power nodes to be operated in a wake-up management mode, to set a start time spot, a time length and a period interval length of a wake-up period that is synchronous among the low power nodes according to the wake-up parameter setting packet. Data corresponding to the low power nodes is transmitted in the wake-up period by the control node. Each of the low power nodes is operated in a wake-up state within the wake-up period to receive the data from the control node and each of the low power nodes is operated in a sleep state outside of the wake-up period.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a Bluetooth mesh network system connection method having wake-up management mechanism to perform synchronous and elastic management of the wake-up period of the lower power nodes to greatly reduce resource consumption of the control node.

Figure 1:
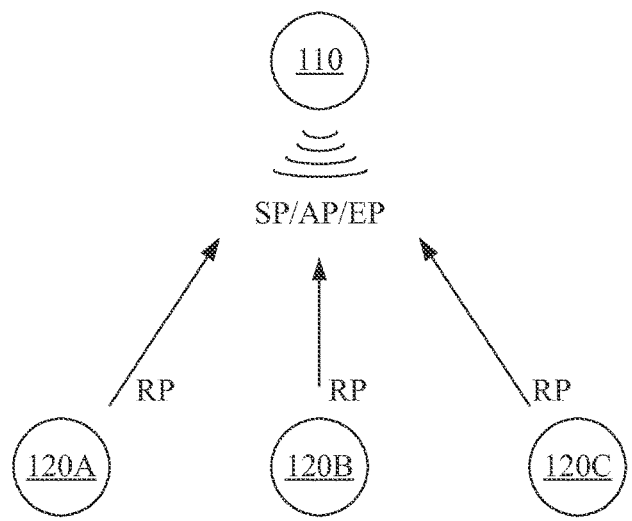
FIG. 1 illustrates a diagram of a Bluetooth mesh network system having wake-up management mechanism according to an embodiment of the present invention.

Reference is now made to FIG. 1. FIG. 1 illustrates a diagram of a Bluetooth mesh network system 100 having wake-up management mechanism according to an embodiment of the present invention. The Bluetooth mesh network system 100 includes a control node 110 and lower power nodes (LPN) 120A-420C. The control node 110 and the lower power nodes 120A-120C performs communication under the protocol of Bluetooth mesh network.

In an embodiment, the control node 110 operates according to a power from a stable power source. The control node 110 can thus be kept in a wakeup state. On the contrary, each of the low power nodes 120A-120C operates according to a power from an unstable power source, e.g., battery. Each of the low power nodes 120A-120C thus has to be kept in a sleep state for a long time. Each of the low power nodes 120A-120C only switches to the wake-up state for a fairly short time period only when necessary, and switches back to the sleep state soon to maintain low power consumption.

The control node 110 is configured to perform management on the wake-up state of the low power nodes 120A-120C, such that the low power nodes 120A-120C have a synchronous wake-up period. The wake-up management mechanism performed on the low power nodes 120A-120C by the control node 110 is described in detail in the following paragraphs.

Figure 2:
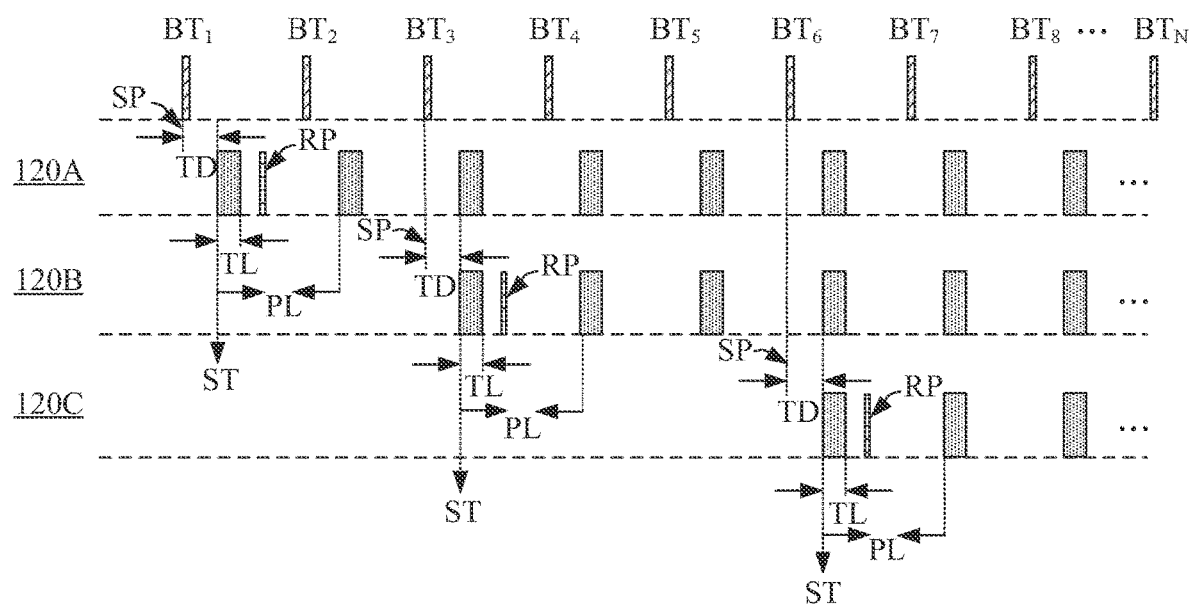
FIG. 2 illustrates a timing diagram of the wake-up management mechanism performed on the low power nodes by the control node according to an embodiment of the present invention.

Reference is now made to FIG. 2. FIG. 2 illustrates a timing diagram of the wake-up management mechanism performed on the low power nodes 120A-120C by the control node 110 according to an embodiment of the present invention.

The control node 110 is configured to broadcast a wake-up parameter setting packet SP at broadcast time spots BT1~BTN based on a broadcast period. The length between every two of the neighboring broadcast time spots (e.g., the broadcast time spot BT1 and the broadcast time spot BT2) is identical and corresponds to a unit time length of a broadcast period.

Each of the low power nodes 120A-120C is configured to receive the wake-up parameter setting packet SP to enter a wake-up management mode. In an embodiment, the low power nodes 120A-120C set a start time spot, a time length and a period interval length of a wake-up period that is synchronous among the low power nodes 120A-120C according to information of the wake-up parameter setting packet SP.

As illustrated in FIG. 2, the low power node 120A receives the wake-up parameter setting packet SP in the broadcast period corresponding to the broadcast time spots BT1 to set the parameters related to the wake-up period. In an embodiment, the parameters related to the wake-up period include the start time spot ST, the time length TL and the period interval length PL.

More specifically, the low power node 120A can set the start time spot ST of the wake-up period at a time spot behind each of the broadcast time spots BT1~BTN for a delay time length TD according to the wake-up parameter setting packet SP. As a result, the low power node 120A starts to be operated in the wake-up period from the start time spot ST, such that the low power node 120A switches from the sleep state to the wake-up state.

The time length TL determines the length of time that the low power node 120A is operated in the wake-up period. After the time length TL, the wake-up period is finished such that the low power node 120A returns to the sleep state from the wake-up state. The period interval length PL determines the time difference between the start time spots ST of every two of the neighboring wake-up periods of the low power node 120A.

In an embodiment, after the low power node 120A finishes setting each of the related parameters of the wake-up period, the low power node 120A transmits a response packet RP to the control node 110 such that the control node 110 records the information of the low power nodes 120A.

Further, the low power node 120B receives the wake-up parameter setting packet SP in the broadcast period corresponding to the broadcast time spot BT3, and the low power node 120C receives the wake-up parameter setting packet SP in the broadcast period corresponding to the broadcast time spot BT6. The low power node 120B and the low power node 120C perform the same procedure to set the parameters of the wake-up period and transmit the response packets after the setting is finished. The detail of the procedure is not further described herein. As a result, the low power nodes 120A~120C have identical wake-up periods after the setting is finished. More specifically, the wake-up period of each of the low power nodes 120A~120C has identical start time spot ST, identical time length TL and identical period interval length PL.

It is appreciated the embodiment that the low power nodes 120A-120C receive the wake-up parameter setting packet SP at different broadcast time spots to perform setting is merely an example. In different embodiments, the low power nodes 120A-120C may receive the wake-up parameter setting packet SP at either the same broadcast time spot or at different broadcast time spots to perform setting according to practical conditions (such as, but not limited to different distances from the control node 110). The present invention is not limited thereto.

In an embodiment, the control node 110 supports a relay node function and is equipped with a function of storing and delivering packets. As a result, after the low power nodes 120A-120C finish setting the wake-up period, the control node 110 is further configured to transmit data corresponding to the low power nodes 120A-120C in the wake-up period, and the low power nodes 120A-120C is operated in a wake-up state within the wake-up period to receive the data from the control node 110. In an embodiment, the control node 110 and each of the low power nodes 120A-120C can perform a multiple to one communication by using broadcasting and scanning through an advertising bearer.

Each of the low power nodes 120A-120C switches from the wake-up state to the sleep state so as to be operated in the sleep state outside of the wake-up period. Under such a condition, the low power nodes 120A-120C do not perform data transmission with the control node 110.

In an embodiment, after the low power nodes 120A-120C are operated in the wake-up management mode, the control node 110 can modify the wake-up period of the low power nodes 120A-420C. More specifically, the control node 110 is further configured to transmit a wake-up parameter modification packet AP in the wake-up period, and the low power nodes 120A-120C modify the time length TL and the period interval length PL of the synchronous wake-up period when the low power nodes 120A-120C receive the wake-up parameter modification packet AP.

In an embodiment, after the low power nodes 120A-120C are operated in the wake-up management mode, the control node 110 can make the low power nodes 120A~120C quit the wake-up management mode. More specifically, the control node 110 is further configured to keep transmitting a quitting packet EP for a time longer than the time length TL of the wake-up period such that the low power nodes 120A~120C quit the wake-up management mode when the low power nodes 120A~120C receive the quitting packet EP.

It is appreciated that in an embodiment, the control node 110 may also selectively transmit the quitting packet EP within the wake-up period. However, since the wake-up period of each of the low power nodes 120A~120C may gradually become out of synchronization due to the different operation clocks therein when the low power nodes 120A~120C operate for a long time. By transmitting the quitting packet EP for the time longer than the time length TL of the wake-up period, the control node 110 is able to make sure each of the low power nodes 120A~120C receive the quitting packet EP.

In some approaches, the low power nodes 120A~120C perform communication with such as, but not limited to a friend node according to different wake-up periods. The friend node has to stores different settings of the different low power nodes 120A~120C and performs communication with the low power nodes 120A~120C at different time spots to deliver the data related to the low power nodes 120A~420C. More resource of the friend node is therefore consumed such that the number of the low power nodes that the friend node is able to connect becomes lower. Besides, by using such a method, the friend node has to make the low power nodes 120A~120C break the connection and reconnect to the friend node when the wake-up periods of the low power nodes 120A~120C are to be modified by the friend node. The modification can not be performed elastically.

The Bluetooth mesh network system 100 having wake-up management mechanism of the present invention allows the low power nodes 120A~120C to set the synchronous wake-up period according to the wake-up parameter setting packet SP transmitted by the control node 110. No matter what the number of the low power nodes 120A~120C is, the control node 110 only needs to store a single setting of the wake-up period and only performs communication with the low power nodes 120A~120C in such a wake-up period. The required resource of the control node 110 can be greatly reduced. Further, the control node 110 can quickly and synchronously modify the wake-up period of the low power nodes 120A~120C in an elastic way by transmitting the wake-up parameter modification packet.

It is appreciated that the number of the low power nodes 120A~120C in the embodiments described above is merely an example. In other embodiments, the number of the low power nodes 120A~120C can be different according to practical requirements and the resource of the control node 110. The present invention is not limited thereto.

Figure 3:
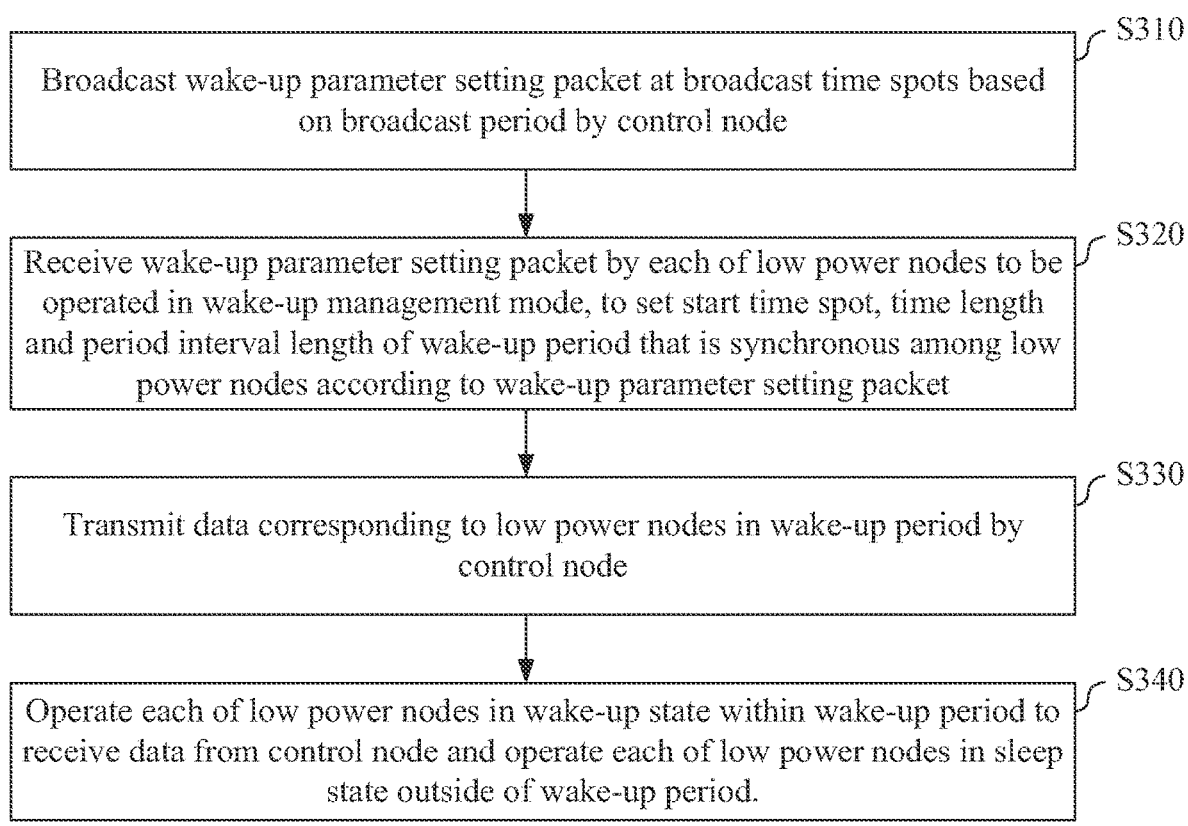
FIG. 3 illustrates a flow chart of a Bluetooth mesh network system connection method having wake-up management mechanism according to an embodiment of the present invention.

Reference is now made to FIG. 3. FIG. 3 illustrates a flow chart of a Bluetooth mesh network system connection method 300 having wake-up management mechanism according to an embodiment of the present invention.

Besides the apparatus described above, the present invention further discloses the Bluetooth mesh network system connection method 300 that can be used in such as, but not limited to the Bluetooth mesh network system 100 illustrated in FIG. 1. An embodiment of the Bluetooth mesh network system connection method 300 is illustrated in FIG. 3 and includes the steps outlined below.

In step S310, the wake-up parameter setting packet SP is broadcasted at the broadcast time spots (e.g. the broadcast time spots BT1~BTN illustrated in FIG. 2) based on the broadcast period by the control node 110.

In step S320, the wake-up parameter setting packet SP is received by each of the low power nodes 120A~120C to be operated in the wake-up management mode, to set the start time spot, the time length and the period interval length of the wake-up period that is synchronous among the low power nodes 120A~120C according to the wake-up parameter setting packet SP.

In step S330, the data corresponding to the low power nodes 120A~120C is transmitted in the wake-up period by the control node 110.

In step S340, each of the low power nodes 120A~120C is operated in the wake-up state within the wake-up period to receive the data from the control node 110 and each of the low power nodes 120A~120C is operated in the sleep state outside of the wake-up period.

It is appreciated that the embodiments described above are merely an example. In other embodiments, it should be appreciated that many modifications and changes may be made by those of ordinary skill in the art without departing from the spirit of the invention.

In summary, the Bluetooth mesh network system and the Bluetooth mesh network system connection method having wake-up management mechanism can perform synchronous and elastic management of the wake-up period of the lower power nodes to greatly reduce resource consumption of the control node.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Bluetooth mesh network system having wake-up management mechanism, comprising:
    a control node configured to keep broadcasting a wake-up parameter setting packet at broadcast time spots based on a broadcast period, wherein the control node operates according to a power from a stable power source and is kept in a wakeup state; and
    a plurality of low power nodes each operating according to a power from an unstable power source and configured to receive the wake-up parameter setting packet only from the control node to be operated in a wake-up management mode, to set a start time spot, a time length and a period interval length of a wake-up period that is synchronous among the low power nodes according to the wake-up parameter setting packet;
    wherein the control node is further configured to transmit data corresponding to the low power nodes in the wake-up period, and each the low power nodes is periodically operated in a wake-up state within the wake-up period to receive the data from the control node and is operated in a sleep state outside of the wake-up period.

2. The Bluetooth mesh network system of claim 1, wherein the low power nodes are configured to set the start time spot at a time spot behind each of the broadcast time spots for a delay time length according to the wake-up parameter setting packet.

3. The Bluetooth mesh network system of claim 1, wherein each of the low power nodes transmits a response packet to the control node after the start time spot, the time length and the period interval length are set, such that the control node records information of the low power nodes according to the response packet.

4. The Bluetooth mesh network system of claim 1, wherein the control node is further configured to transmit a wake-up parameter modification packet in the wake-up period, and the low power nodes modify the time length and the period interval length of the synchronous wake-up period when the low power nodes receive the wake-up parameter modification packet.

5. The Bluetooth mesh network system of claim 1, wherein the control node is further configured to keep transmitting a quitting packet for a time longer than the time length of the wake-up period such that the low power nodes quit the wake-up management mode when the low power nodes receive the quitting packet.

6. A Bluetooth mesh network system connection method having wake-up management mechanism, comprising:
    keeping broadcasting a wake-up parameter setting packet at broadcast time spots based on a broadcast period by a control node, wherein the control node operates according to a power from a stable power source and is kept in a wakeup state;
    operating according to a power from an unstable power source and receiving the wake-up parameter setting packet only from the control node by each of a plurality of low power nodes to be operated a wake-up management mode, to set a start time spot, a time length and a period interval length of a wake-up period that is synchronous among the low power nodes according to the wake-up parameter setting packet;
    transmitting data corresponding to the low power nodes in the wake-up period by the control node; and periodically operating each of the low power nodes in a wake-up state within the wake-up period to receive the data from the control node and operating each of the low power nodes in a sleep state outside of the wake-up period.

7. The Bluetooth mesh network system connection method of claim 6, further comprising:
setting the start time spot at a time spot behind each of the broadcast time spots for a delay time length according to the wake-up parameter setting packet by the low power nodes.

8. The Bluetooth mesh network system connection method of claim 6, further comprising:
transmitting a response packet to the control node by each of the low power nodes after the start time spot, the time length and the period interval length are set, such that the control node records information of the low power nodes according to the response packet.

9. The Bluetooth mesh network system connection method of claim 6, further comprising:
transmitting a wake-up parameter modification packet in the wake-up period by the control node; and
modifying the time length and the period interval length of the synchronous wake-up period by the low power nodes when the low power nodes receive the wake-up parameter modification packet.

10. The Bluetooth mesh network system connection method of claim 6, further comprising:
keeping transmitting a quitting packet for a time longer than the time length of the wake-up period by the control node; and
quitting the wake-up management mode by the low power nodes when the low power nodes receive the quitting packet.

* * * * *